United States Patent [19]
Weiss et al.

[11] Patent Number: 5,547,049
[45] Date of Patent: Aug. 20, 1996

[54] MAGNETORHEOLOGICAL FLUID COMPOSITE STRUCTURES

[75] Inventors: Keith D. Weiss, Cary; Theodore G. Duclos, Holly Springs; Michael J. Chrzan, Raleigh; Lynn C. Yanyo, Cary, all of N.C.

[73] Assignee: Lord Corporation, Cary, N.C.

[21] Appl. No.: 251,562

[22] Filed: May 31, 1994

[51] Int. Cl.$^6$ ...................................... F16F 15/03
[52] U.S. Cl. ............................................. 188/267
[58] Field of Search ..................... 188/267, 378, 188/379, 322.5; 267/140.14, 140.15; 252/62.52, 62.51, 78.3, 572, 502, 503, 519, 309, 513, 62.56, 62.53, 62.54, 62.55, 74, 75, 71, 512

[56] References Cited

U.S. PATENT DOCUMENTS

| | | | |
|---|---|---|---|
| 2,661,596 | 12/1953 | Winslow | 60/52 |
| 2,751,352 | 6/1956 | Bondi | 252/62.5 |
| 3,207,269 | 9/1965 | Klass | 188/87 |
| 4,565,940 | 1/1986 | Hubbard, Jr. | 310/326 |
| 4,733,758 | 3/1988 | Duclos et al. | 188/267 |
| 4,869,476 | 9/1989 | Shtarkman | 267/140.1 |
| 4,923,057 | 5/1990 | Carlson et al. | 188/378 |
| 4,992,190 | 2/1991 | Shtarkman | 252/62.52 |
| 5,257,681 | 11/1993 | Shtarkman | 188/267 |
| 5,277,281 | 1/1994 | Carlson et al. | 188/267 |
| 5,284,330 | 2/1994 | Carlson et al. | 267/140.14 |
| 5,354,488 | 11/1994 | Shtarkman | 188/267 |

FOREIGN PATENT DOCUMENTS 2267947 12/1993 United Kingdom.
WOA9410691 5/1994 WIPO.

OTHER PUBLICATIONS

SAE 1993 Transactions, vol. 102, No. 2, 1993 Warrendale, USA, pp. 425–430, K. D. Weiss, et al. "High Strength Magneto– and Electro–rheological Fluids".
1994 International Conference On Intelligent Materials; Keith D. Weiss et al; Viscoelastic Properties Of Magneto– and Electro–Rheological Fluids; Jun. 5–8, 1994.

*Primary Examiner*—Robert J. Oberleitner
*Assistant Examiner*—C. T. Bartz
*Attorney, Agent, or Firm*—Wayne W. Rupert

[57] ABSTRACT

Controllable composite structure or structural elements enclose magnetorheological fluids as a structural component between opposing containment layers to form at least a portion of any variety of extended mechanical systems, such as plates, panels, beams and bars or structures including these elements. The control of the stiffness and damping properties of the structure or structural elements is accomplished by changing the shear and compression/tension moduli of the magnetorheological fluid by varying the applied magnetic field. The composite structures of the present invention may be incorporated into a wide variety of mechanical systems for control of vibration and other properties.

6 Claims, 8 Drawing Sheets

MAGNETORHEOLOGICAL FLUID COMPOSITE STRUCTURES

FIELD OF THE INVENTION

The present invention relates generally to the control of flexible, undamped or lightly damped structures, and more specifically, the present invention relates to the use of magnetorheological fluids as a structural component to obtain controllable behavior in extended mechanical systems, such as plates, panels, beams and bars or structures including such elements. The composite structures of the present invention may be incorporated in a wide variety of mechanical systems for the control of vibration and other properties.

BACKGROUND OF INVENTION

In conventional mechanical structures the globally distributed stiffness and damping characteristics of the system are fixed parameters which cannot be easily changed or controlled once fabrication is complete. In order to limit the bending or flexing of the structural elements in an extended mechanical structure, the control of the stiffness and damping parameters are desirable. Applications in which controllable structural behavior will find utility include, but are not limited to, controlling vibrations and sound propagation in aerospace and automotive structures, such as walls and panels; flexible fixturing in manufacturing systems; and improving response time associated with the manipulation of robotic structural elements.

The result of the interaction between a mechanical structure and external dynamic forces, such as air/water-borne sound waves, direct excitation, and turbulences caused by the movement of the structure in air/water, is the generation and propagation of flexural waves within the structure. If the intensity of these resonant waves is large, the structure may become permanently deformed or damage to electronic or mechanical equipment attached to the structure may occur. The generation of waves in the structure of smaller intensity causes the radiation of unacceptable sound disturbances (i.e., noise), as well as vibrations that decrease the useful life of sensitive equipment attached to the structure.

The damping control of systems in which motion results in the bending or flexing of structural elements can only be adequately accomplished through the utilization of a distributed or global methodology. Although localized damping utilizing discrete devices, such as the electrorheological and magnetorheological fluid containing dampers or mounts described in U.S. Pat. Nos. 3,207,269, 4,720,087, 4,733,758, 5,277,281, and 5,284,330 can be used as couplings between the element(s) to be isolated and the source of the mechanical disturbance, they are inherently inadequate in controlling the overall constitutive characteristics of a mechanical structure. Spatially discrete damping devices, such as actuators, dampers and mounts, are limited in the number of vibrational modes that can adequately be controlled. In order to provide overall control of the desired stiffness and damping characteristics in an extended structure utilizing such devices, an unacceptable number/variety of damping elements would be required.

Conventional distributed damping in a structure involves placing a viscoelastic solid or polymer in contact with the surface of the vibrating structure. The viscoelastic polymer sometimes is coated with a thin constraining barrier layer in order to improve performance by increasing the dissipation of energy from the system. The problem with using a conventional viscoelastic solid is that the damping of the system is optimized for a single temperature and frequency. The poor performance of conventional passive damping methodology is related to the infinite number of frequencies at which resonant waves can propagate through a structure.

U.S. Pat. No. 4,565,940 describes an attempt to provide optimum damping control in a conventional system through the use of piezoelectric ceramic and polymeric films as a constraining layer. In this system the damping effect of the constraining layer is controlled by varying the electric voltage applied to the film. Unfortunately, the brittleness and difficulty associated with manufacturing large, thin piezoelectric ceramic films precludes their use in commercial applications. Although piezoelectric polymers are readily available in flexible films, they are incapable of producing the forces necessary to adequately provide the desired level of damping in any practical system.

Another approach to providing distributed control of the damping characteristics of a structure is provided in U.S. Pat. No. 4,923,057. This patent describes the utilization of electrorheological fluids as a medium through which the control of the overall dynamic properties of a structure can be achieved. In this system the electrorheological fluid is contained in a region within the structure. The variability in the complex shear and compression/tension moduli exhibited by the electrorheological fluid as a function of applied electric field strength allows for the control of the stiffness and damping characteristics exhibited by a structure. Unfortunately, the moduli exhibited by electrorheological fluids are several orders of magnitude less than that exhibited by conventional viscoelastic solids or polymers.

Conventional damping of an extended structure using a viscoelastic solid, constrained layers or discrete, localized devices, such as actuators, dampers and mounts, inherently suffer from an inability to control the overall stiffness and damping characteristics exhibited by a structure over a broad temperature and excitation frequency range. The utilization of piezoelectric ceramic or polymeric films as the constraining layer do not meet conventional system needs by being either brittle and difficult to manufacture or incapable of producing the forces necessary to adequately provide the desired level of damping. Although electrorheological fluids can provide distributed control of the overall damping characteristics of an extended structure, the moduli exhibited by these materials are several orders of magnitude smaller than the moduli observed for common viscoelastic solids. A need, therefore, exists for the development of a material that exhibits complex shear and compression/tension moduli comparable in magnitude to conventional viscoelastic solids along with the controllable characteristics exhibited by electrorheological fluids.

SUMMARY OF THE INVENTION

The present invention provides for control of the mechanical characteristics of structures which incorporate as at least a portion thereof magnetorheological fluids enclosed between containment layers. The storage and loss components of the shear and compression/tension moduli exhibited by the magnetorheological fluid can be varied as a function of applied magnetic field, thereby permitting continuously variable control of the stiffness and damping characteristics of mechanical structural elements, such as plates, panels, beams and bars, and mechanical composite systems containing such structural elements.

The magnetorheological fluid structural elements are comprised of containment layers which provide for structural integrity and can likewise serve as magnetic pole faces. These containment layers are generally parallel and create a void or region that is used to hold the magnetorheological fluid. These parallel containment layers are separated from each other by magnetically insulating containment layers in order for a magnetic field to pass through the contained magnetorheological fluid. The magnetic field is generated using either a permanent magnet or an electromagnet. Variation in the magnetic field provides the requisite control for selecting the desired properties of the magnetorheological fluid and, therefore, the mechanical behavior of the structure. Multiple structural elements may be arranged in a series configuration and an overlying configuration in order to provide controllable laminae or configured in a contiguous position to provide regional or patterned control of the stiffness and damping of a composite structure.

The structures and structural elements of the present invention may also be used to exhibit controllable static properties. If the structure or structural element is initially deformed, then a magnetic field is applied, all or part of the deformation within the structure may be retained until the magnetic field is removed. In this case, the structure or structural element will maintain the stressed condition and not return to its original shape until the magnetic field is removed. A similar type of static response is obtained when the deformable structure consists of a magnetorheological fluid encapsulated within a flexible, magnetically insulating, containment layer. In this case, the magnetic field must be generated by the object that comes in contact with the structure or structural element. These deformable structures may be configured with any variety of flexible protrusions depending upon the desired function for gripping or immobilizing objects.

The magnetorheological fluid used in the structural elements and composite structures of the present invention basically consists of magnetically polarizable particles dispersed in a carder medium. The particle component of the magnetorheological fluid can be comprised of essentially any solid which is known to exhibit magnetorheological activity. The magnetorheological fluid may also contain other optional additives such as surfactants or dispersants, thixotropes, dyes or pigments, abrasive particles, lubricants, pH shifters, salts, deacidifiers, and corrosion inhibitors.

DESCRIPTION OF THE PREFERRED EMBODIMENTS

Figure 1A:
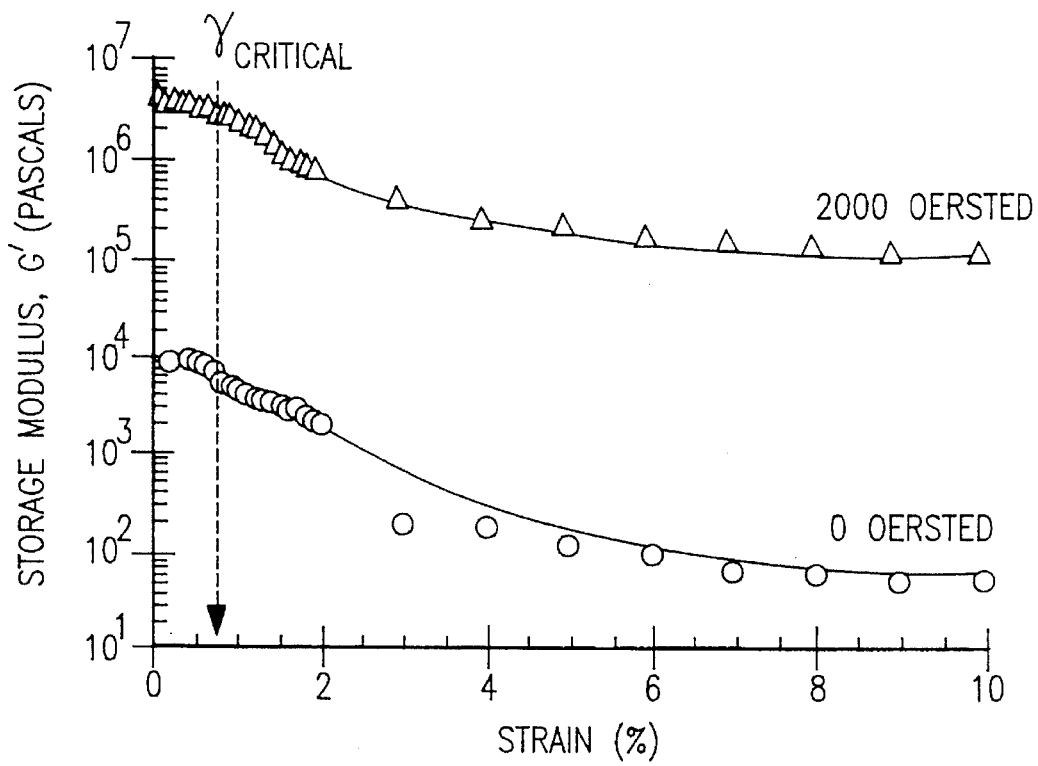
FIG. 1(a) illustrates the critical strain for a magnetorheological fluid (VERSAFLO MR-100 fluid, Lord Corporation) as determined from a plot of the measured shear storage moduli, G', as a function of strain (0 and 2000 Oersted magnetic field strength). The data are measured at a frequency of 1.5 Hertz.

The present invention involves the control of flexible, undamped or lightly damped structures, which may include such elements as plates, panels, beams or bars, by using magnetorheological fluids as a structural component through which distributed control of the overall structural characteristics can be obtained. It has been discovered that magnetorheological fluids exhibit complex moduli that are comparable in magnitude to common viscoelastic solids and controllable through the application of a magnetic field. It further has been discovered that magnetorheological fluids provide a plateau region when subjected to a broad range of strains in which the stiffness of the fluid increases proportionately with the applied magnetic field, while the damping ratio exhibited by the fluid remains constant. Magnetorheological fluids, therefore, are ideally suited for providing distributed damping to structures wherein the fluid is subjected to a minimal strain rate.

Viscoelasticity is defined as the ability of a material to respond to an applied force by exhibiting both elastic and viscous properties depending upon the time scale of the measurement. Under constant deformation a viscoelastic material is capable of storing part of the input energy and dissipating the rest of this energy as heat. Upon removal of the applied force, the deformed material will attempt to recover a portion of its original shape. Since magnetorheological fluids are multiphase materials consisting of a dispersion of polarizable particles in a carrier medium, they exhibit viscoelastic properties. A more thorough description of viscoelastic behavior is provided by either R. Darby in "Viscoelastic Fluids: An Introduction to Properties and Behavior" (Marcel Dekker, Inc.; New York; 1976) or J. Ferry in "Viscoelastic Properties of Polymers" (2nd edition, John Wiley & Sons, Inc.; New York; 1970).

Magnetorheological fluids behave as a Bingham plastic solid in the presence of a magnetic field, while exhibiting Newtonian characteristics in the absence of a magnetic field. The formation of particle chains upon the application of a magnetic field is essential to the operation of a magnetorheological fluid. In the presence of a shear force, the equilibrium established between the formation and breaking of particle fibrils corresponds to the static yield stress defining the onset of flow. The flow properties of a magnetorheological fluid, such as dynamic yield stress and elastic viscosity, are important for discrete devices (i.e., dampers, mounts, clutches, valves, and brakes) that operate at relatively high strain rates. The strain rates typically encountered in these discrete devices are on the order of 100 to 10,000 sec$^{-1}$. A more thorough description of the flow characteristics exhibited by magnetorheological fluids is provided by Weiss, et al. in "High Strength Magneto- and Electro-Rheological Fluids" (Technical Paper #932451, Society of Automotive Engineers, Warrendale, Pa.; 1993).

The behavior of a magnetorheological fluid that is important in the present invention relates to the behavior of the fluid either prior to the static yield stress defining the onset of flow or the region surrounding this yield stress as characterized by a low strain rate, typically less than about 1 sec$^{-1}$, with smaller strain rates being preferred. Prior to yielding magnetorheological fluids exhibit elastic properties described by the classical relationships that exist between the storage modulus and loss modulus. The transition from elastic to viscous behavior occurs at a point parametrically described by the static yield stress and a yield or critical strain. Since the complex shear modulus of a material measured in the elastic region is a function of only temperature and frequency, the critical strain represents the strain level at which the complex shear modulus deviates from linear behavior.

The behavior of a magnetorheological fluid that is most useful in the present invention is an increase in the shear and compression/tension moduli with increasing magnetic field strength that occurs in the region prior to or surrounding the yield point. The shear characteristics exhibited by the magnetorheological fluid in this region are best described by a complex shear modulus (G*) as shown in Equation 1. The real part of this complex modulus, which is called the storage modulus (G'), has been found to increase with increasing magnetic field strength and frequency. The imaginary part of this complex modulus, which is called the loss modulus (G"), also increases with increasing magnetic field and frequency. In a similar manner the real and imaginary parts of the complex compression/tension modulus, E' and E", respectively, can be changed by varying the applied magnetic field.

$$G^*=G'+iG'' \quad (1)$$

As the names indicate the storage moduli, G' and E', represent a measure of the energy stored by the system, while the loss moduli, G" and E", represent a measure of the energy dissipated or lost from the system. The ratio of the loss modulus to the corresponding storage modulus provides a common representation of the damping for a viscoelastic material. This damping ratio, which is sometimes referred to as the loss factor (tan σ), represents a measure of the relative viscous and elastic behavior exhibited by a magnetorheological fluid. A magnetorheological fluid in the elastic region will exhibit a very small loss factor, typically less than 0.1. The loss factor associated with a magnetorheological fluid exhibiting pure viscous behavior as exemplified by excessive flow conditions (i.e., high strain rates) will be much greater than 1.0. Thus, it is the magnetic field dependence of complex shear and compression/tension moduli that controls the overall bending stiffness and damping of composite structures.

The vibration characteristics of a structure, such as those consisting of one or more plates, panels, beams, bars or mixtures thereof, are determined by the distribution of masses, stiffness and damping behavior exhibited by the individual components of the structure. When the structure interacts with an external dynamic force, such as air/water borne sound waves, direct excitation, or turbulences, the frequencies of the excitation wave that resonates through the structure is controlled by the stiffness and mass distribution in the structural elements. The magnitude of this resonant wave is controlled by the damping characteristics of the structure. According to the present invention the frequency and magnitude of this excitation wave resonating through a structure are controlled by changing the stiffness and damping characteristics of the structure. These stiffness and damping characteristics of the structure are in turn controlled by varying the magnetic field dependent storage and loss moduli exhibited by a magnetorheological fluid. A commonly accepted theoretical treatment of viscoelastic damping appropriate to various structures is provided by D. Ross, E. Unger, and E. Kerwin in "Damping of Plate Flexural Vibrations by Means of Viscoelastic Laminae" (J. Ruzicka, ed.; *Structural Damping;* Sec. 3; The American Society of Mechanical Engineers, New York; 1959).

The shear and compression/tension properties of magnetorheological fluids typically can be characterized using conventional, dynamic mechanical testing techniques. The shear properties associated with the magnetorheological fluid, VersaFlo™ MR-100 fluid (Lord Corporation), are measured using a couette test cell (gap equals 1.5 mm) on a strain controlled rheometer. The magnetic field is generated perpendicular to the annular gap made by the inner bob and the outer cup in the test cell by applying an electrical current to a coil of copper wire. The compression/tension properties associated with the magnetorheological fluid are measured using a parallel plate test cell (gap equals 0.8 mm) on a mechanical analyzer. The magnetic field is generated parallel with the gap made by the two plates through the use of a permanent magnet. In both these tests a comparison of the sinusoidal strain input wave and the measured sinusoidal stress output wave provides the information needed to determine the complex shear and compression/tension moduli of the magnetorheological fluid.

Figure 1B:
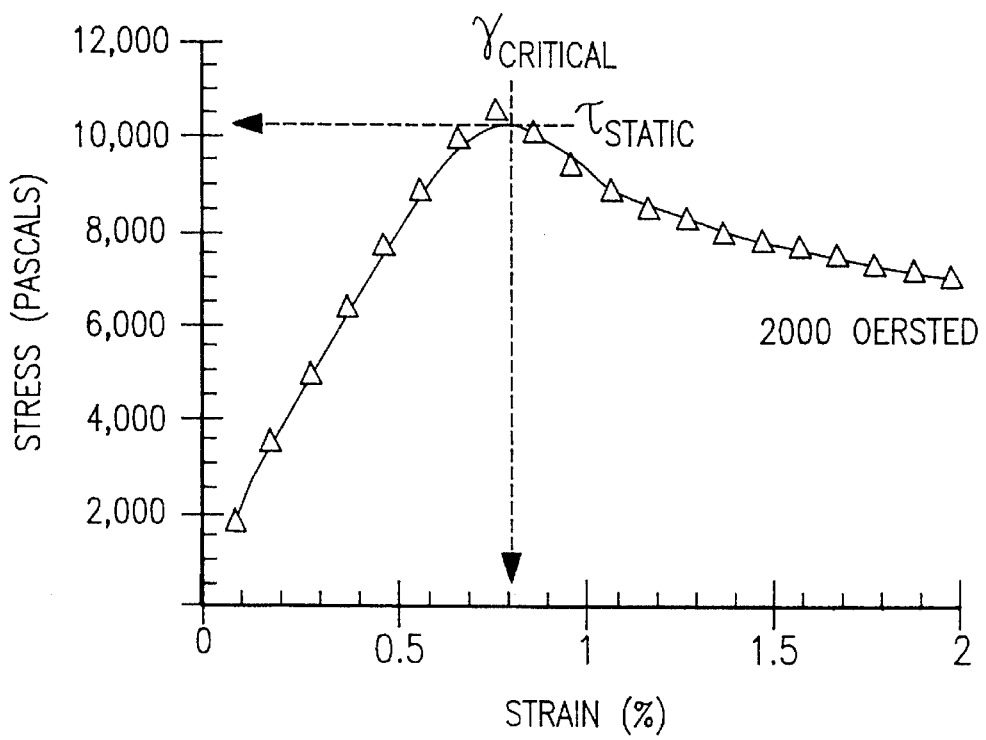
FIG. 1(b) illustrates the critical strain and static yield stress for a magnetorheological fluid as determined from a plot of the measured stress for a magnetorheological fluid (2000 Oersted magnetic field strength) as a function of strain.

Magnetorheological fluids typically yield at a critical strain, $\gamma_{critical}$, of about 1.0%. The critical strain is defined to be the strain at which the storage modulus of the magnetorheological fluid deviates from linear behavior. As shown in FIG. 1(a), the critical strain for a magnetorheological fluid (VersFlo™ MR-100 fluid, Lord Corporation) is found to be at a level of 0.8%. This critical strain level does not change in going from an off-state (no magnetic field) to an on-state (applied magnetic field). Confirmation of this critical strain is provided in FIG. 1(b) where the maximum measured stress, which corresponds to the static yield stress for the magnetorheological fluid, also occurs at 0.8% strain. The magnitude of the static yield stress shown in FIG. 1(b) at the critical strain is dependent upon the magnitude of the applied magnetic field.

Prior to this yield point the magnetorheological fluid exhibits elastic properties as demonstrated by the linearity in the shear storage modulus. The controllability of the shear storage modulus of the magnetotheological fluid is demonstrated in FIG. 1(a) by the several orders of magnitude difference observed in the magnitude of the shear storage modulus in the off-state and an on-state (2000 Oersted magnetic field). The value observed for the shear storage modulus in the presence of a 2000 Oersted magnetic field of $2.5 \times 10^6$ Pascals demonstrates that the storage modulus exhibited by a magnetorheological fluid under moderate magnetic field strengths is similar in magnitude to the values reported for the storage modulus of common viscoelastic solids or polymers. The shear storage modulus measured for a magnetorheological fluid also is several orders of magnitude greater than the magnitude of the shear storage modulus exhibited by electrotheological fluids.

Figure 1C:
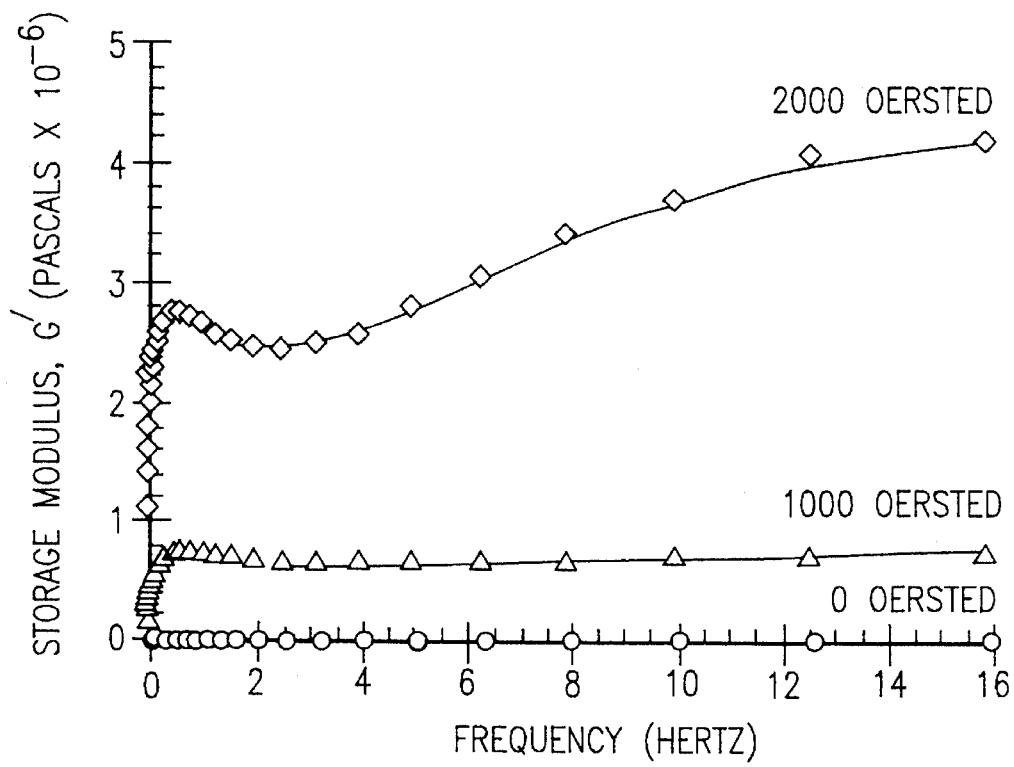
FIG. 1(c) illustrates the shear storage modulus, G', exhibited by a magnetorheological fluid prior to its critical yield strain at magnetic field strengths of 0, 1000 and 2000 Oersted plotted as a function of frequency. All data are obtained at a strain level of 0.5%.

In addition to being controllable upon varying the magnitude of a magnetic field, the shear storage modulus of a magnetotheological fluid also increases with an elevation in the frequency of oscillation. The storage modulus for a magnetotheological fluid at low frequency (1.5 Hz) and field strengths, 1000 and 2000 Oersted, is on the order of $8.0 \times 10^5$ and $2.5 \times 10^6$ Pascals, respectively, as shown in FIG. 1(c). An additional increase in the shear storage modulus can be obtained for this magnetorheological fluid by increasing the applied field strength or the frequency. The highest measured value of the shear storage modulus over the limited range of frequencies that were tested is $4.2 \times 10^6$ Pascals at 2000 Oersted (16 Hz).

The shear loss factor typically exhibited by a magnetorheological fluid will gradually ascend after the yield point has been surpassed. This loss factor will reach a value of about 1.0 at a strain of about 7.0%. A loss factor of about 1.0 represents a material that exhibits approximately an equal amount of elastic and viscous behavior. Thus the useful strain range over which a magnetorheological fluid exhibits elastic properties can be extended past the critical yield point. In contrast, electrorheological fluids exhibit a shear loss factor greater than 1.0 at very low levels of strain (<2%).

Figure 1D:
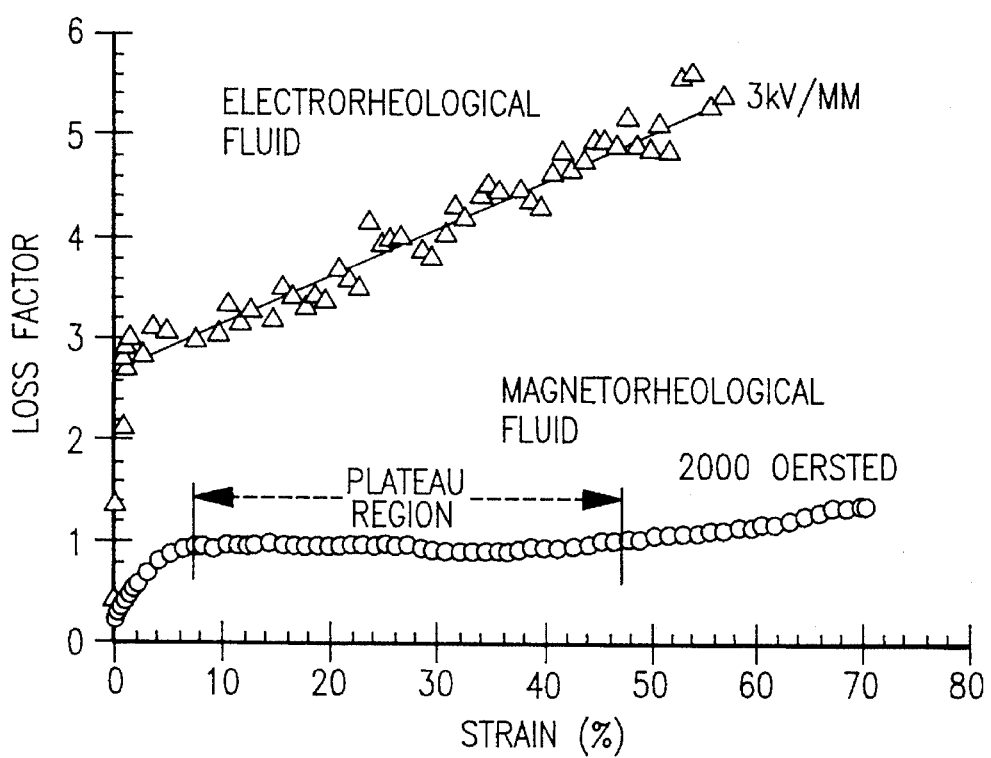
FIG. 1(d) compares the shear loss factor versus strain level curve obtained for a magnetorheological fluid with a similar curve measured for an electrorheological fluid (ER-III, Lord Corporation) at a magnetic field strength and electric field strength of 2000 Oersted and 3000 volts/mm, respectively.

A comparison of the shear loss factors observed for a magnetorheological fluid and an electrorheological fluid (ERX-III, Lord Corporation) is provided in FIG. 1(d). The loss factor measured for the electrorheological fluid is observed to rapidly rise to a value of 3.0 after reaching the critical strain level. This loss factor continues to increase, although more gradually, with the input of larger levels of strain. The loss factor measured for the magnetorheological fluid is observed to ascend more gradually than the loss factor exhibited by the electrorheological fluid. The loss factor measured for the magnetorheological fluid approaches a value of approximately 1.0 around the strain level of 7.0%. More importantly, this loss factor remains relatively constant over the strain range of 7 to 47%. The strain rate established by the viscous properties exhibited by the magnetorheological fluid over the strain range of this plateau region is negligible in that it is less than about 1.0 sec$^{-1}$. Increasing the strain level past this plateau region causes a gradual increase in the measured loss factor for this magnetorheological fluid. The ability to operate a magnetorheological fluid within the strain range of about 7 to 47%, preferably 10 to 40%, both extends the useful range over which viscoelastic properties can be controlled and provides a mechanism through which heat can be dissipated from the structural system.

Figure 1E:
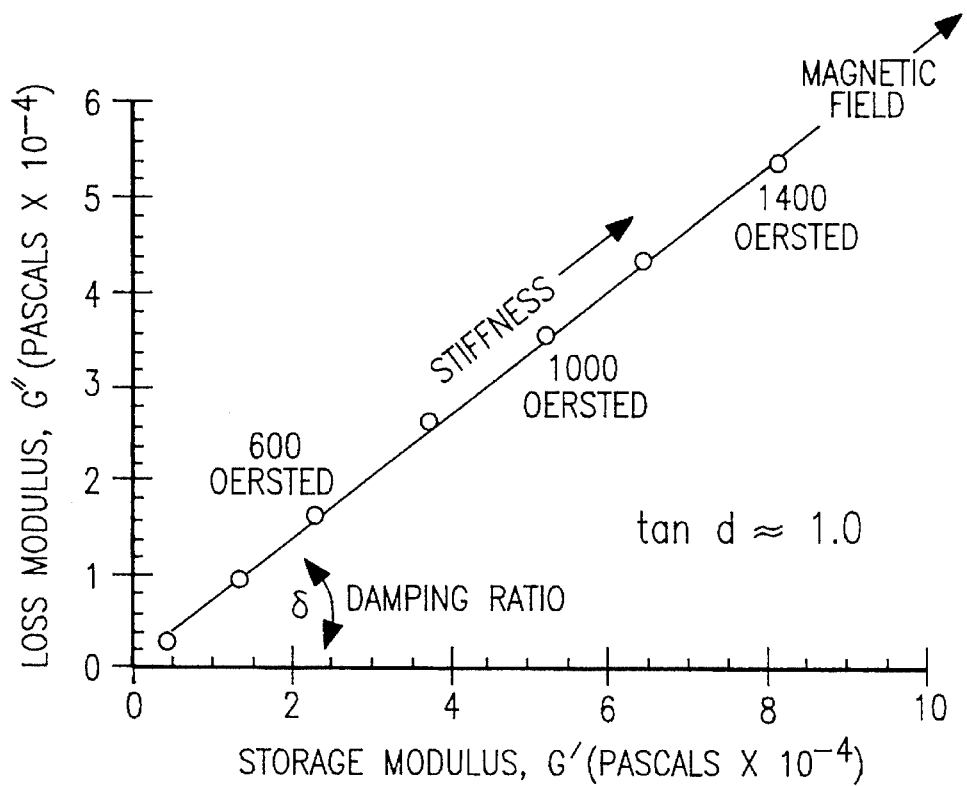
FIG. 1(e) plots the shear loss modulus, G", measured for a magnetorheological fluid at 10% strain and various magnetic field strengths as a function of the shear storage modulus, G', measured for the fluid.

The importance of this plateau region is further elucidated by recognizing that the shear storage and loss moduli of a magnetorheological fluid increase with applied magnetic field at the same rate as shown in FIG. 1(e). Another way of looking at this is that the complex shear modulus, G*, increases more or less proportionately with applied field, while the corresponding loss factor remains fixed. Thus both the viscous and elastic properties exhibited by the magnetorheological fluid have the same dependence upon an applied magnetic field. A magnetorheological fluid when operated in this plateau region provides an engineer with a material that exhibits a unique combination of properties, namely, controllable stiffness and a constant damping ratio.

Figure 2:
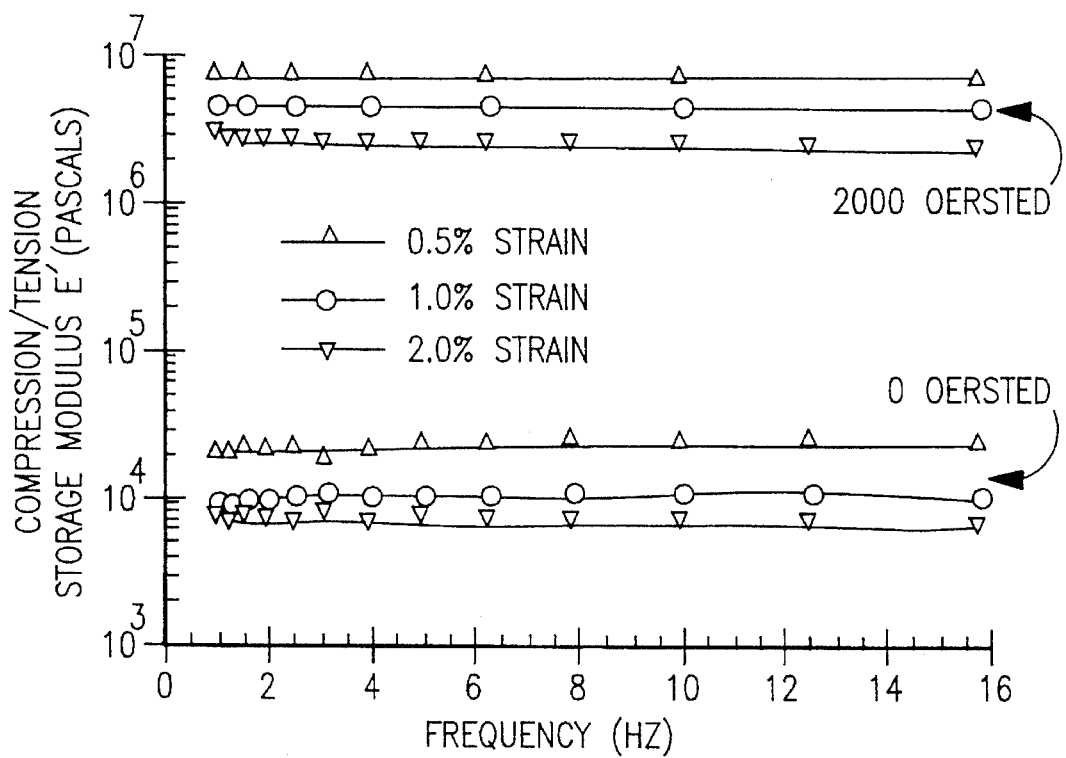
FIG. 2 illustrates the compression/tension modulus, E', measured for a magnetorheological fluid at various magnetic field strengths (0 and 2000 Oersted) and strain levels (0.5, 1.0 and 2.0%) plotted as a function of frequency.

Controllability of the compression/tension properties associated with a magnetorheological fluid is demonstrated in FIG. 2 by the several orders of magnitude difference observed in the magnitude of the compression/tension storage modulus in the off-state and an on-state (2000 Oersted magnetic field). The narrow range of values observed for the compression/tension storage modulus in the presence of a 2000 Oersted magnetic field at various strain levels of $2.5 \times 10^6$ to $7.1 \times 10^6$ Pascals demonstrates that the storage modulus exhibited by a magnetotheological fluid under moderate magnetic field strengths is similar in magnitude to the values reported for the compression/tension modulus of common viscoelastic solids and polymers.

It is important in the design of a structure that the magnetorheological fluid be placed in a strategic configuration or location so that the amount of energy stored by the fluid represents a large fraction of the total structural energy storage. The magnetorheological fluid is held in place within the structure through the use of containment layers. These containment layers can be made of metal and metal alloys, as well as polymeric materials, such as rubber or elastomers. Examples of metals include but are not limited to steel, aluminum and magnesium, while examples of polymeric materials include butyl, silicone, and nitrile rubbers. In order to apply a magnetic field to the magnetorheological fluid, it is important that a portion of at least two containment layers surrounding the magnetorheological fluid that are parallel to each other be capable of carrying a magnetic field of which steel is the preferred material. These containment layers may provide structural integrity to the system. Variation in the magnetic field established within or through these containment layers provides the requisite control for selecting the desired properties of the magnetorheological fluid and the mechanical behavior of the overall system. These containment layers may either be placed in an overlying configuration, an overlapping configuration, and a series type arrangement to provide controllable laminae or in multiple contiguous locations to provide either regional or patterned control of the structural properties. The magnetic field applied to each area containing magnetorheological fluid may be controlled individually or in combination.

The magnetic field may be applied to the magnetotheological fluid either perpendicular or parallel to the overall length of the structure, as well as combinations thereof. When the magnetic field is applied in a perpendicular fashion, the magnetic poles in the containment layers are positioned above and below the magnetorheological fluid allowing the field to pass through the thickness of the fluid.

When this structural element is forced into a flexural mode of deformation, the magnetorheological fluid is subjected to a state of shear. In this situation the controllability of the complex shear modulus dominates the overall behavior of the structure. When the magnetic field is applied in a parallel fashion, the magnetic poles in the containment layers are positioned on opposite sides of the magnetorheological fluid allowing the field to pass through the length of the fluid. When this structural element is forced into a flexural mode of deformation, the magnetorheological fluid is subjected to a state of axial tension. In this situation the controllability of the complex compression/tension modulus dominates the overall behavior of the structure.

The magnetic field may be generated by the use of permanent magnets, electromagnets, or combinations thereof. The controllability of the magnetic field strength is typically obtained by varying the electrical current flowing through an electrically conductive medium. Examples of electrically conductive media include metals, metal alloys, conductive polymers, and mixtures thereof. The conductive medium may be in a variety of shapes, which include wires, bars, and rods. Ideally, the conductive medium will consist of copper in the shape of a wire. The strength of the magnetic field generated by applying an electric current to a copper wire can be determined by the magnetomotance of the circuit classically defined as the product obtained between the magnitude of the applied current and the number of wire turns. When a permanent magnet is used to generate the field applied to the magnetorheological fluid, the flow of electrical current through a conductive medium is used to generate a secondary magnetic field that can cancel or neutralize all or part of the magnetic field seen by the fluid. An in-depth discussion of the design and construction of basic magnetic circuits is provided by W. Hayt, Jr. in "Engineering Electromagnetics" (McGraw Hill Co.; New York; 1981).

Figure 3A:
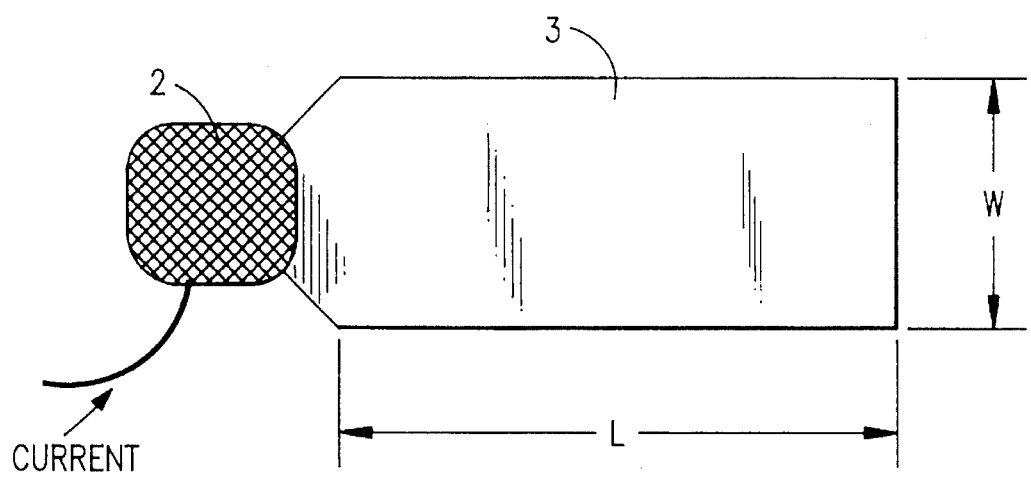
FIG. 3(a) is an illustration (top view) of a structural beam filled with a magnetorheological fluid.
Figure 3B:
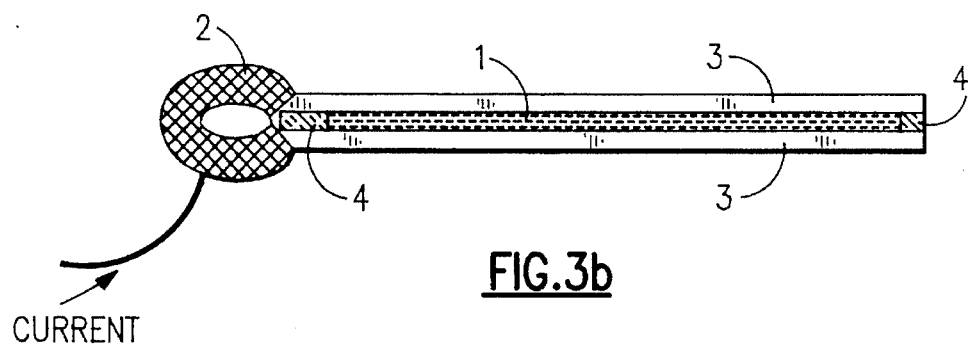
FIG. 3(b) is a cut-away illustration (side view) of a structural beam filled with a magnetorheological fluid.
Figure 3C:
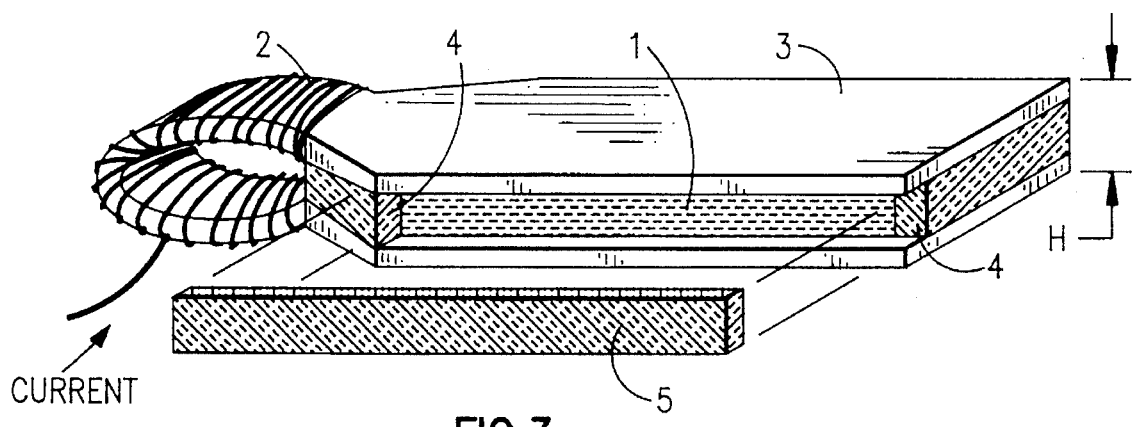
FIG. 3(c) is a cut-away illustration (parametric view) of a structural beam filled with a magnetorheological fluid.

FIGS. 3(a), 3(b), and 3(c) illustrate a controllable structure of the present invention in the shape of a beam. In this case, the magnetic field is applied to the magnetorheological fluid 1 through the use of a coil of wire 2 attached to one end of the containment layers 3. The containment layers 3 must be made of a material, such as steel, that can carry a magnetic field. The magnetorheological fluid 1 is held between containment layers 3 by the use of containment layers 4, which consist of a material that is magnetically insulating, such as aluminum or rubber. As made apparent in the cut-away diagram in FIG. 3(c), the two containment layers 4 are connected to each other along the length, L, of containment layers 3 through the use of an additional magnetically insulating containment layer 5, thereby, encapsulating the magnetorheological fluid within the structure. Although the structure shown in FIGS. 3(a–c) is in the form of a beam, it would be easy for one skilled in the art to modify this concept for use in structures that are either in the shape of or incorporate the shape of plates, panels, and bars.

Since the width, W, of the two containment layers 3 in FIGS. 3(a–c) is larger than the distance separating these parallel containment layers as given by the height, H, of containment layers 4 the magnetorheological fluid will be predominately subjected to a state of shear when the beam is flexurally deformed. In this case, the complex shear modulus as previously described is primarily used to provide controllability of the structure. If the height, H, of the containment layers 4 were greater than the width of containment layers 3, then the magnetorheological would be subjected to axial tension and the complex compression/tensile modulus as previously described would be primarily used to provide structural controllability. A structural element that is placed in a mode of flexural deformation in a real application will always subject a magnetorheological fluid to a certain amount of shear and axial tension. Although certain structural element geometries will cause one of these mechanical situations to dominate as described above, these effects can not be completely separated or isolated from each other.

Figure 4A:
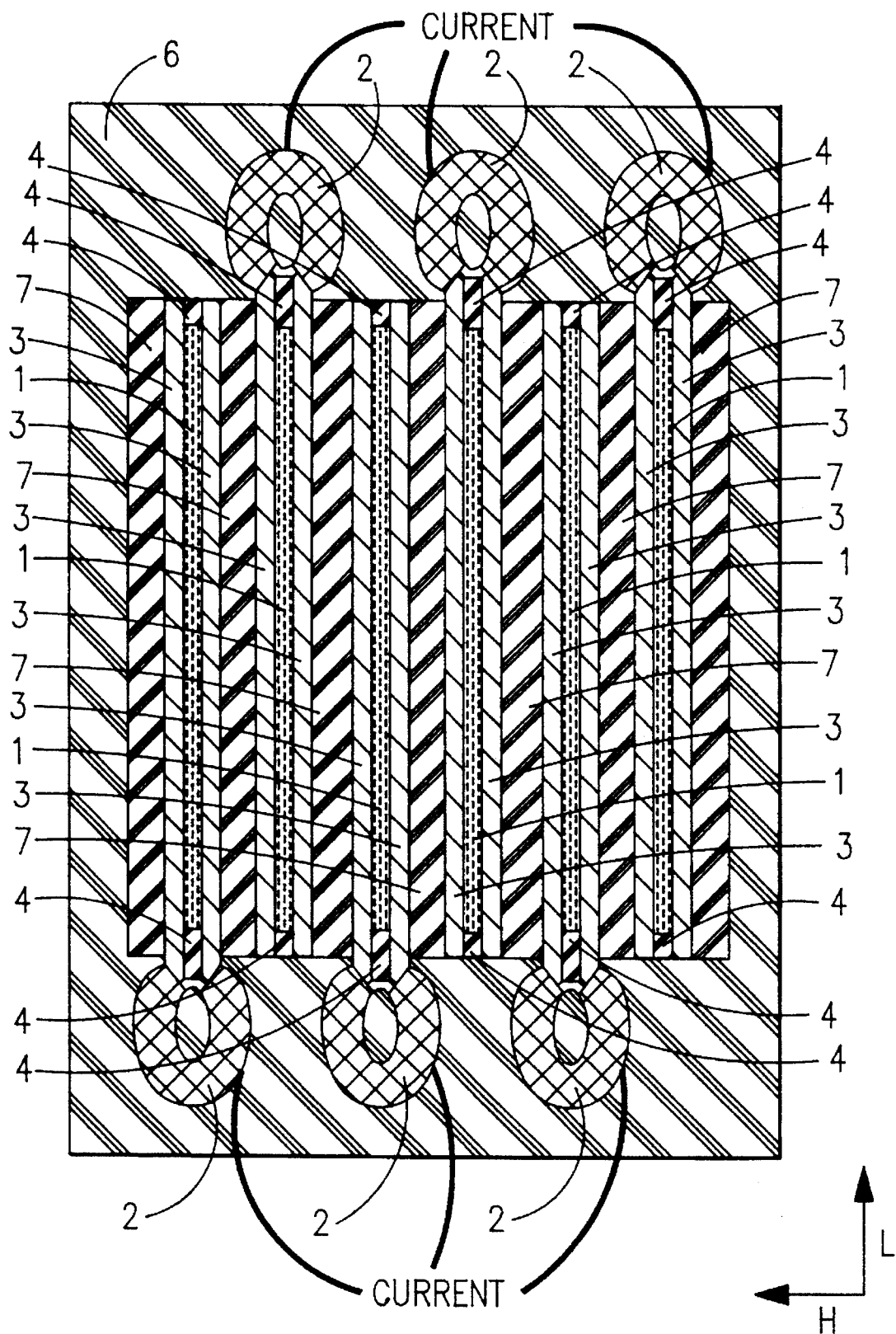
FIG. 4(a) is a cut-away illustration (top view) of a structural composite consisting of controllable structural elements positioned in a series type configuration.
Figure 4B:
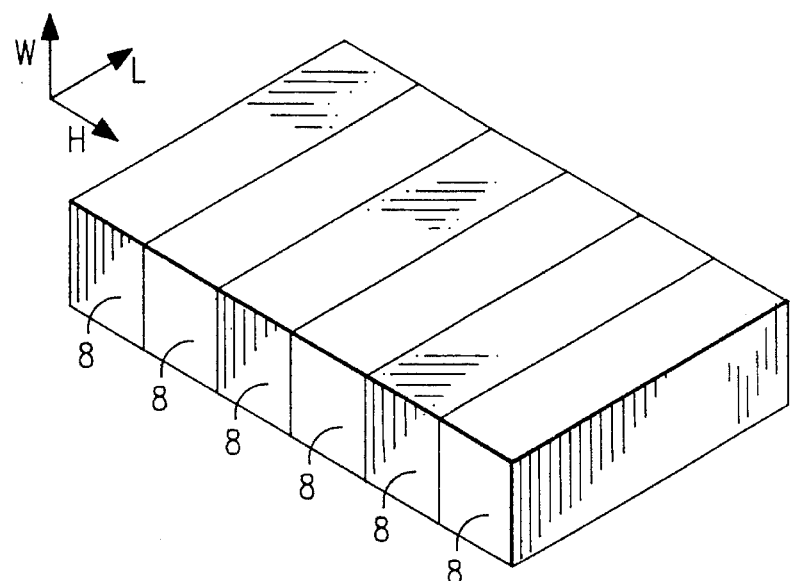
FIG. 4(b) is a 3-dimensional illustration of the magnetorheological fluid structural composite shown previously in FIG. 4(a).

For applications in which control of the compression/tension or elongation properties is desirable, the use of a composite structure or laminate as shown in FIGS. 4(a–b) is preferred. In this configuration, containment layers 3 are placed in a series type arrangement as shown in FIG. 4(a), such that multiple regions exist for the encapsulation of the magnetorheological fluid 1. A single or multiple power sources may be used to selectively supply the current to the coils of copper wire 2 in order to create the desired magnetic field applied across the magnetorheological fluid 1 held between the various containment layers 3. As previously described, magnetically insulating, containment layers 4 and 5 are used to separate containment layers 3 and enclose the magnetorheological fluid 1. These magnetically insulating layers may be separate components or part of a larger one component as shown in FIG. 4(a). The laminate may be further encased in a magnetically insulating shell 6 in order to provide additional rigidity to the structure. The separation between each structural element is maintained by the use of an additional magnetically insulating containment layer 7. For clarification, the composite structure shown in FIG. 4(a) is drawn in full perspective in FIG. 4(b). Each structural element 8 in this composite structure contains all of the necessary and optional components, such as the magnetorheological fluid 1, coil of wire 2, and containment layers 3, 4, 5, 6, and 7.

Figure 5A:
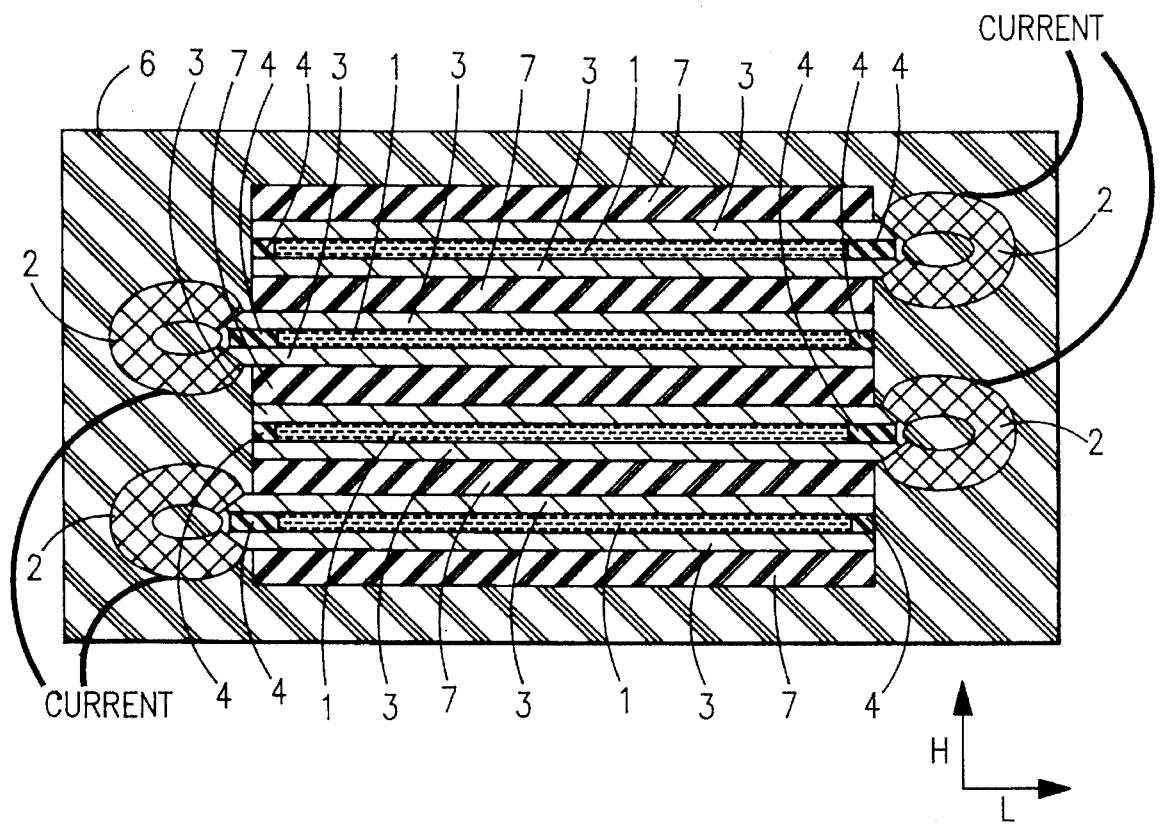
FIG. 5(a) is a cut-away illustration (top view) of a structural composite consisting of controllable structural elements positioned in multiple overlying layers.
Figure 5B:
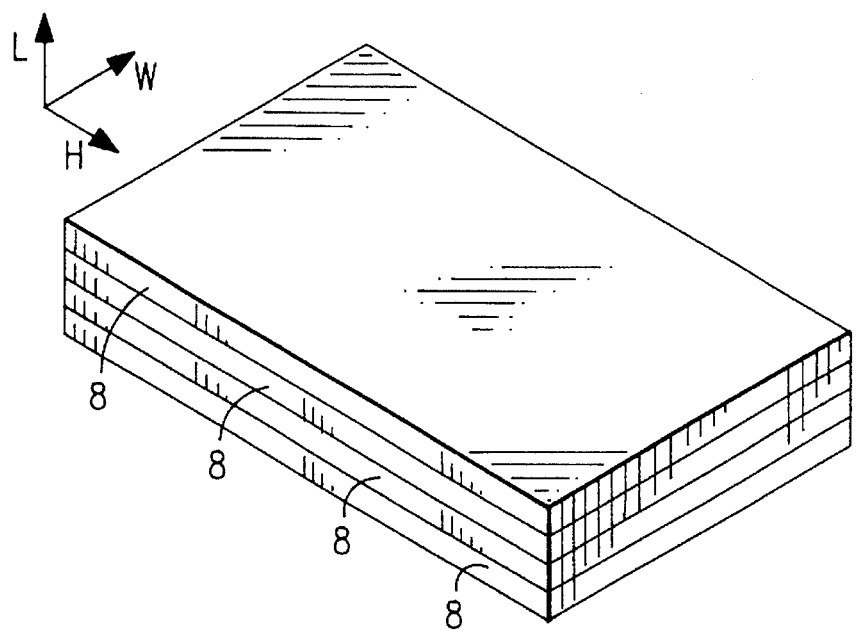
FIG. 5(b) is a 3-dimensional illustration of the magnetorheological fluid structural composite shown previously in FIG. 5(a).
Figure 6:
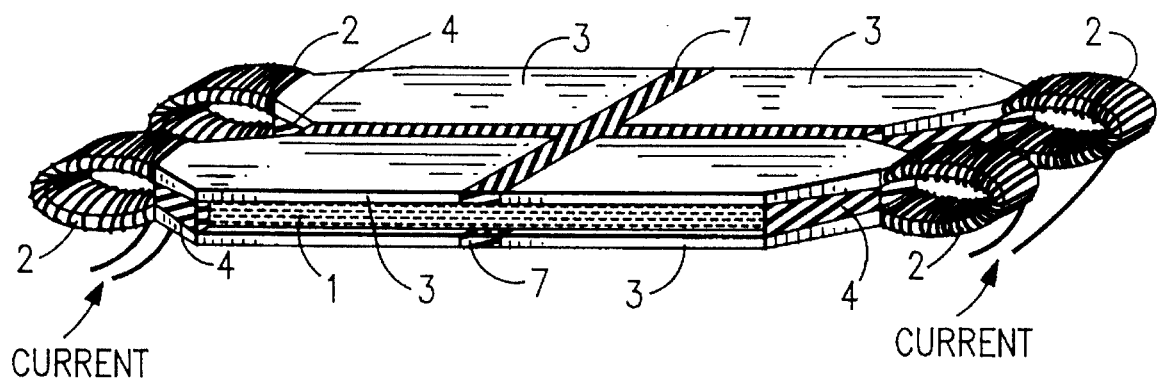
FIG. 6 is a schematic representation in perspective of multiple contiguously interconnected magnetorheological fluid structural elements.

The magnetorheological fluid filled composite structures of the present invention are versatile in their geometric configuration or arrangement relative to one another, for example, multiple containment layers 3 having magnetorheological fluid 1 encased within the structure by containment layers 4 and 5 can be either stacked in an overlying configuration to form a single structure or laminate as shown in FIGS. 5(a–b) or integrated horizontally to form a parallel contiguous laminate as shown in FIG. 6 in order to provide regional or patterned control of the stiffness and damping of the composite structure. The magnetic field applied to the magnetorheological fluid 1 in each stacked or parallel component through a coil of copper wire 2 and containment layers 3 may be controlled in combination or separately in order to provide variable control of different sections or zones within the laminate. The number, thickness and other dimensions of the laminate can be varied depending upon the application. It is preferred that the stacked or parallel laminae be separated by an additional magnetically insulating, containment layer 7 with further encasement of the laminae using a magnetically insulating shell 6 in order to provide additional rigidity to the structure. For clarification, the composite structure shown in FIG. 5(a) is drawn in full perspective in FIG. 5(b). Each structural element 8 in this composite structure contains all of the necessary and optional components, such as the magnetorheological fluid 1, coil of wire 2, and containment layers 3, 4, 5, 6, and 7.

Figure 7A:
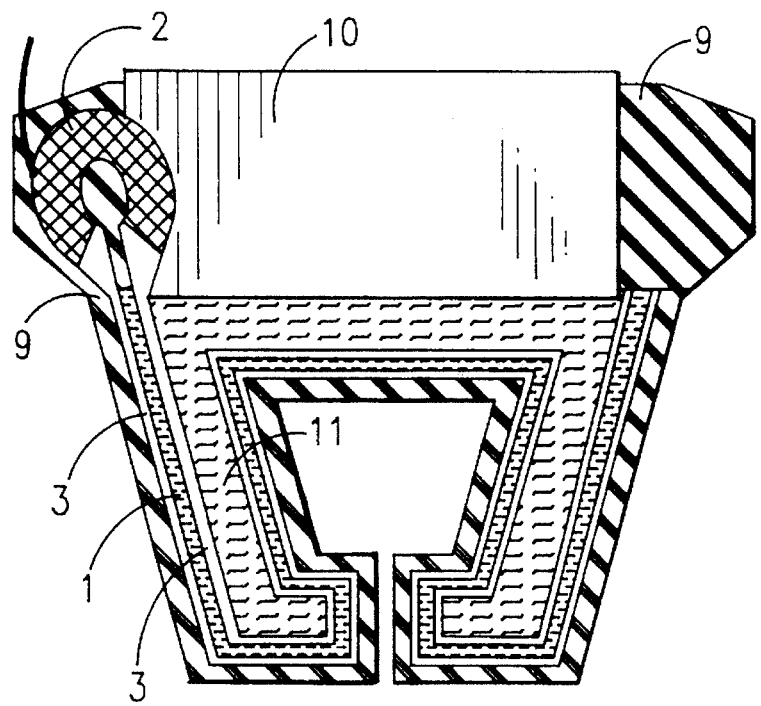
FIG. 7(a) is a schematic representation in partial cross-section showing a gripping apparatus containing a magnetorheological fluid structural element.

The structures and structural elements of the present invention may also be used to exhibit controllable static properties. If the structure or structural element is initially deformed, then a magnetic field is applied, all or part of the deformation within the structure may be retained until the magnetic field is removed. In this case, the structure or structural element will maintain the stressed condition and not return to its original shape until the magnetic field is removed. FIG. 7(a) illustrates a deformable structure consisting of containment layers 3, a magnetorheological fluid 1, and a magnetically insulating, containment layer 9. It is preferred that the containment layers 3 and 9 be flexible in nature. The containment layers are secured in a suitable manner to a base 10 with the interior of the structure 11 being filled with a gas, liquid or other fluid media. In the absence of a magnetic field the flexible structure is placed in contact with an object (not shown), thereby, becoming deformed. Upon the application of a magnetic field, the structure becomes more rigid and capable of maintaining the deformed shape, possibly gripping the object, as desired. This deformable structure may also be configured with any variety of flexible protrusions depending upon the desired function for gripping or immobilizing objects.

Figure 7B:
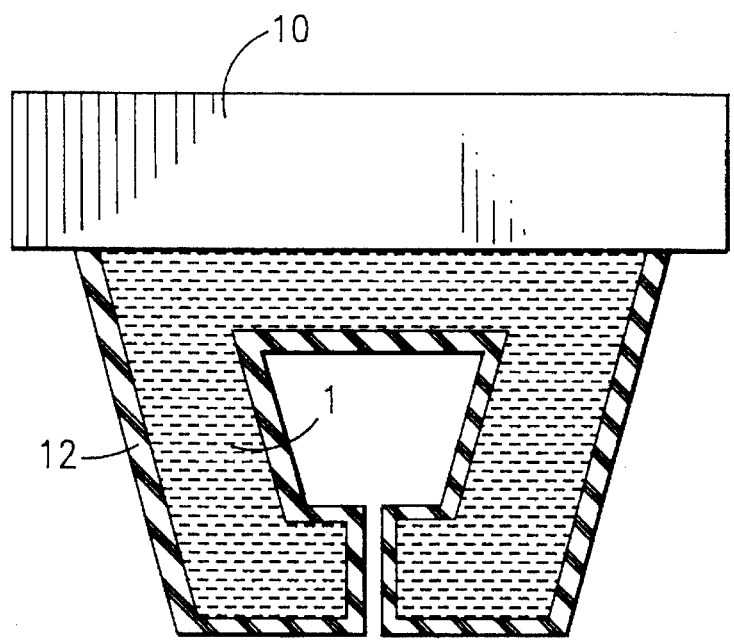
FIG. 7(b) is a schematic representation in partial cross-section showing a gripping apparatus wherein the gripping mechanism is a flexible magnetorheological fluid structural element.

A similar type of static response can be obtained for a deformable structure consisting of magnetorheological fluid 1 encapsulated within a flexible, magnetically insulating, containment layer 12 secured to a base 10 as shown in FIG. 7(b). In this case, the absence of any containment layers 3 would require that the magnetic field be generated by the object that comes in contact with the structure or structural element. Upon coming in contact with an object (not shown) that generates a magnetic field, the part of the structure in the vicinity of the object would become more rigid and capable of deforming to the shape of the object in order to hold or grip the object. Once the object and magnetic field is removed, the structure would return to its original shape. This deformable structure may also be configured with any variety of flexible protrusions depending upon the desired function for gripping or immobilizing objects.

The magnetorheological fluid 1 used in the structures and structural elements of the present invention basically consists of magnetically polarizable particles dispersed in a carrier medium. The particle component of the magnetorheological fluid can be comprised of essentially any solid which is known to exhibit magnetorheological activity. Typical particle components useful in the present invention are comprised of, for example, paramagnetic, superparamagnetic or ferromagnetic compounds. Specific examples of particle components useful in the present invention include particles comprised of materials such as iron, iron oxide, iron nitride, iron carbide, carbonyl iron, chromium dioxide, low carbon steel, silicon steel, nickel, cobalt, and mixtures thereof. The iron oxide includes all known pure iron oxides, such as $Fe_2O_3$ and $Fe_3O_4$, as well as those containing small amounts of other elements, such as manganese, zinc or barium. Specific examples of iron oxide include ferrites and magnetites. In addition, the particle component can be comprised of any of the known alloys of iron, such as those containing aluminum, silicon, cobalt, nickel, vanadium, molybdenum, chromium, tungsten, manganese and/or copper.

The particle component can also be comprised of iron-cobalt and iron-nickel alloys. The iron-cobalt alloys preferred for use in a magnetorheological fluid have an iron:cobalt ratio ranging from about 30:70 to 95:5, preferably ranging from about 50:50 to 85:15, while the iron-nickel alloys have an iron:nickel ratio ranging from about 90:10 to 99:1, preferably ranging from about 94:6 to 97:3. The iron alloys may contain a small amount of other elements, such as vanadium, chromium, etc, in order to improve the ductility and mechanical properties of the alloys. These other elements are typically present in an amount that is less than about 3.0% by weight. Examples of iron-cobalt alloys include HYPERCO (Carpenter Technology), HYPERM (F. Krupp Widiafabrik), SUPERMENDUR (Arnold Eng.) and 2V-PERMENDUR (Western Electric).

The particle component of the present invention is typically in the form of a metal powder which can be prepared by processes well known to those skilled in the art. Typical methods for the preparation of metal powders include the reduction of metal oxides, grinding or attrition, electrolytic deposition, metal carbonyl decomposition, rapid solidification, or smelt processing. Various metal powders that are commercially available include straight iron powders, reduced iron powders, insulated reduced iron powders, cobalt powders, and various alloy powders, such as [48%]Fe/[50%]Co/[2%]V. The diameter of the particles utilized herein can range from about 0.1 to 500 µm, preferably from about 1.0 to 250 µm, with from about 1.0 to 50 µm being specifically preferred.

The particle component typically comprises from about 5 to 50, preferably from about 15 to 40, percent by volume of the total composition depending on the desired magnetic activity and viscosity of the overall material. This corresponds to about 30 to 89, preferably about 59 to 85, percent by weight when the carrier medium and particle of the magnetorheological material have a specific gravity of about 0.95 and 7.86, respectively.

The carrier medium of the magnetorheological fluid of the present invention can be any non-polar and polar carder liquid or vehicle previously disclosed for use in magnetorheological fluids. Examples of carrier vehicles include silicone oils, mineral oils, paraffin oils, silicone copolymers, white oils, hydraulic oils, chlorinated hydrocarbons, transformer oils, halogenated aromatic liquids, halogenated paraffins, diesters, polyoxyalkylenes, perfluorinated polyethers, fluorinated hydrocarbons, fluorinated silicones, cyanoalkylsiloxanes, water, glycols, and mixtures thereof. Naturally occurring transformer oils include refined mineral oils that have low viscosity and high chemical stability. Synthetic transformer oils generally comprise chlorinated aromatics (chlorinated biphenyls and trichlorobenzene), which are known collectively as "askarels", silicone oils, and esteric liquids such as dibutyl sebacates.

The carrier vehicle of the magnetorheological fluid should have a viscosity at 25° C. that is between about 1 and 100,000 centipoise, preferably between about 1 and 10,000 centipoise, with a viscosity between about 1 and 1000 centipoise being especially preferred. The carrier vehicle is typically utilized in an amount ranging from about 50 to 95, preferably from about 55 to 90, with from about 65 to 80, percent by volume of the total magnetorheological fluid being especially preferred. This corresponds to about 10.5 to 69.0, preferably about 12.5 to 51.4, with about 17.9 to 31.9, percent by weight being especially preferred when the carrier vehicle and particle component of the magnetotheological fluid have a specific gravity of about 0.95 and 8.10, respectively.

A surfactant to more adequately disperse the particle component in the carrier vehicle may also be optionally utilized in the magnetorheological fluid. Such surfactants include known surfactants or dispersing agents such as ferrous oleate and naphthenate, metallic soaps (e.g., aluminum tristearate and distearate), alkaline soaps (e.g., lithium and sodium stearate), sulfonates, phosphate esters, stearic acid, glycerol monooleate, sorbitan sesquioleate, stearates, laurates, fatty acids, fatty alcohols, and other surface active agents. In addition, the optional surfactant may be comprised of steric stabilizing molecules, including fluoroaliphatic polymeric esters and titanate, aluminate or zirconam coupling agents. The optional surfactant may be employed in an amount ranging from about 0.1 to 20 percent by weight relative to the weight of the particle component.

Particle settling may be minimized in the magnetorheological materials of the present invention by forming a thixotropic network. A thixotropic network is defined as a suspension of particles that, at low shear rates, form a loose network or structure sometimes referred to as clusters or flocculates. The presence of this three-dimensional structure imparts a small degree of rigidity to the magnetorheological material, thereby reducing particle settling. However, when a shearing force is applied through mild agitation, this structure is easily disrupted or dispersed. When the shearing force is removed, this loose network is reformed over a period of time. A thixotropic network may be formed in the magnetorheological fluid of the present invention through the utilization of any known hydrogen-bonding thixotropic agents and/or colloidal additives. The thixotropic agents and colloidal additives, if utilized, are typically employed in an amount ranging from about 0.1 to 5.0, preferably from about 0.5 to 3.0, percent by volume relative to the overall volume of the magnetorheological fluid.

Examples of hydrogen-bonding thixotropic agents include low molecular weight hydrogen-bonding molecules, such as water and other molecules containing hydroxyl, carboxyl or amine functionality, as well as medium molecular weight hydrogen-bonding molecules, such as silicone oligomers, organosilicone oligomers, and organic oligomers. Typical low molecular weight hydrogen-bonding molecules other than water include alcohols, glycols, alkyl amines, amino alcohols, amino esters, and mixtures thereof. Typical medium molecular weight hydrogen-bonding molecules include oligomers containing sulphonated, amino, hydroxyl, cyano, halogenated, ester, carboxylic acid, ether, and ketone moieties, as well as mixtures thereof.

Examples of a colloidal additive to a magnetorheological fluid include hydrophobic and hydrophilic metal oxide and high molecular weight powders. Examples of hydrophobic powders include surface-treated hydrophobic fumed silica and organo-clays. Examples of hydrophilic metal oxide or polymeric materials include silica gel, fumed silica, clays, and high molecular weight derivatives of caster oil, poly(ethyleneoxide), and poly(ethylene glycol).

The magnetorheological fluid may also contain other optional additives such as dyes or pigments, abrasive particles, lubricants, pH shifters, salts, deacidifiers, or corrosion inhibitors. These optional additives may be in the form of dispersions, suspensions, or materials that are soluble in the carrier vehicle.

The magnetorheological fluids are typically prepared by initially mixing the ingredients together by hand (low shear) with a spatula or the like and then subsequently more thoroughly mixing (high shear) with a homogenizer, mechanical mixer or shaker or dispersing with an appropriate milling device such as a ball mill, sand mill, attritor mill, colloid mill, paint mill, or the like, in order to create a more stable suspension.

Various changes, alternatives and modifications will become apparent to those of ordinary skill in the art following a reading of the foregoing description. Thus the above detailed description is provided for purposes of illustrating the invention and should not be construed as limiting the scope of the invention which is defined by the claims.

What is claimed is:

1. A flexible structural element in the form of a beam, panel, bar, or plate that includes a magnetorheological fluid comprising of a particle component containing 1.0 to 500 μm size paramagnetic, superparamagnetic or ferromagnetic particles in an amount equal to 5 to 50 percent by volume of the total composition, a carrier component having a viscosity of 1 to 100,000 centipoise in an amount equal to 50 to 95 percent by volume of the total composition, and a dispersant present in an amount of 0.1 to 20 percent by weight relative to the weight of the particle component, wherein the dispersant is selected from the group of ferrous oleate and naphthenate, metallic soaps, alkaline soaps, sulfonates, phosphate esters, stearic acid, glycerol monooleate, sorbitan sesquioleate, stearates, laurates, fatty acids, fatty alcohols, fluoroaliphatic polymeric esters and titanate, aluminate and zirconate coupling agents, and wherein said magnetorheological fluid is confined in place by containment layers within said structural element and at least a portion of two of said containment layers being capable of allowing a magnetic field to be applied to the fluid, wherein flexing of said structural element imparts shear and axial tension to said fluid, the magnitude of said magnetic field is selected for defining the complex moduli of said fluid and the resultant complex stiffness and damping characteristics globally distributed over said structural element and a permanent magnet or an electromagnet is contiguous with an end of said containment layers.

2. A flexible structural element in the form of a beam, panel, bar, or plate that includes a magnetorheological fluid comprising of a particle component containing 1.0 to 500 μm size paramagnetic, superparamagnetic or ferromagnetic particles in an amount equal to 5 to 50 percent by volume of the total composition, a carrier component having a viscosity of 1 to 100,000 centipoise in an amount equal to 50 to 95 percent by volume of the total composition, and a hydrogen-bonding thixotropic agent, a colloidal additive, or mixture thereof, present in an amount equal to 0.1 to 5.0 percent by volume relative to the volume of the total composition, and wherein said magnetorheological fluid is confined in place by containment layers within said structural element and at least a portion of two of said containment layers being capable of allowing a magnetic field to be applied to the fluid, wherein flexing of said structural element imparts shear and axial tension to aid fluid, the magnitude of said magnetic field is selected for defining the complex moduli of said fluid and the resultant complex stiffness and damping characteristics globally distributed over said structural element and a permanent magnet or an electromagnet is contiguous with an end of said containment layers.

3. The structural element according to claim 2 wherein the thixotropic agent or colloidal additive is present in an amount equal to 0.5 to 3.0 percent by volume relative to the volume of the total composition.

4. The structural element according to claim 2 wherein the thixotropic agent is selected from the group of water; alcohols; glycols; alkyl amines; amino alcohols; amino esters; oligomers containing sulphonated, amino, hydroxyl, cyano, halogenated, ester, carboxylic acid, ether, or ketone moieties; natural and synthetic water-soluble gums, and resins.

5. The structural element according to claim 2 wherein the colloidal additive is selected from the group of surface-treated hydrophobic fumed silica and organo-clays; hydrophilic silica gel, fumed silica, and clays; and high molecular weight derivatives of caster oil, poly(ethyleneoxide), and poly(ethylene glycol).

6. A flexible structural element in the form of a beam, panel, bar, or plate that includes a magnetorheological fluid comprising of a particle component containing 1.0 to 500 μm size paramagnetic, superparamagnetic or ferromagnetic particles in an amount equal to 5 to 50 percent by volume of the total composition, a carrier component having a viscosity of 1 to 100,000 centipoise in an amount equal to 50 to 95 percent by volume of the total composition, and a component selected from the group consisting of a corrosion inhibitor, a colored pigment, a lubricant, a pH shifter, a salt, or a deacidifier, wherein said magnetorheological fluid is confined in place by containment layers within said structural element and at least a portion of two of said containment layers being capable of allowing a magnetic field to be applied to the fluid, wherein flexing of aid structural element imparts shear and axial tension to said fluid, the magnitude of said magnetic field is selected for defining the complex moduli of said fluid and the resultant complex stiffness and damping characteristics globally distributed over said structural element and a permanent magnet or an electromagnet is contiguous with an end of said containment layers.

\* \* \* \* \*

UNITED STATES PATENT AND TRADEMARK OFFICE
CERTIFICATE OF CORRECTION

PATENT NO. : 5,547,049
DATED : August 20, 1996
INVENTOR(S) : Weiss, et al.

It is certified that error appears in the above-indentified patent and that said Letters Patent is hereby corrected as shown below:

IN THE ABSTRACT

Line 2, replace "magnetotheological" with --magnetorheological--.

Col. 3, line 37, replace "carder" with --carrier--.

Col. 5, line 5, replace "cattier" with --carrier--.
Col. 6, line 59, replace "magnetotheological" with --magnetorheological--.
Col. 6, line 64, replace "magnetotheological" with --magnetorheological--.
Col. 7, line 11, replace "magnetotheological" with --magnetorheological--.
Col. 7, line 24, replace "electrotheological" with --electrorheological--.
Col. 7, line 27, replace "magnetotheological" with --magnetorheological--.
Col. 7, line 29, replace "magnetotheological" with --magnetorheological--.
Col. 8, line 29, replace "magnetotheological" with --magnetorheological--.
Col. 8, line 61, replace "magnetotheological" with --magnetorheological--.
Col. 12, line 27, replace "carder" with --carrier--.
Col. 12, line 53, replace "magnetotheological" with --magnetorheological--.
Col. 13, line 1, replace "conam" with --conate--.

UNITED STATES PATENT AND TRADEMARK OFFICE
CERTIFICATE OF CORRECTION

PATENT NO. : 5,547,049
DATED : August 20, 1996
INVENTOR(S) : Weiss, et al.

It is certified that error appears in the above-indentified patent and that said Letters Patent is hereby corrected as shown below:

Claim 2, col. 14, line 41, replace "aid" with --said--.
Claim 6, col. 16, line 1, replace "aid" with --said--.

Signed and Sealed this

Twenty-eighth Day of January, 1997

Attest:

BRUCE LEHMAN

Attesting Officer    Commissioner of Patents and Trademarks